US011763351B2

(12) United States Patent
Armitage et al.

(10) Patent No.: US 11,763,351 B2
(45) Date of Patent: Sep. 19, 2023

(54) FUNDRAISING PLATFORM

(71) Applicant: Oklahoma Blood Institute, Oklahoma City, OK (US)

(72) Inventors: John Brooks Armitage, Oklahoma City, OK (US); Justin Ryan Redwine, Oklahoma City, OK (US)

(73) Assignee: Oklahoma Blood Institute, Oklahoma City, OK (US)

( * ) Notice: Subject to any disclaimer, the term of this patent is extended or adjusted under 35 U.S.C. 154(b) by 54 days.

(21) Appl. No.: 15/472,448

(22) Filed: Mar. 29, 2017

(65) Prior Publication Data
US 2018/0285942 A1  Oct. 4, 2018

(51) Int. Cl.
*G06Q 30/00* (2023.01)
*G06Q 30/0279* (2023.01)
*G06Q 30/0217* (2023.01)

(52) U.S. Cl.
CPC ..... *G06Q 30/0279* (2013.01); *G06Q 30/0218* (2013.01)

(58) Field of Classification Search
CPC ................. G06Q 30/0279; G06Q 30/0218
See application file for complete search history.

(56) References Cited

U.S. PATENT DOCUMENTS

| 2004/0133468 | A1* | 7/2004 | Varghese | G06Q 30/02 705/14.2 |
| 2008/0281704 | A1* | 11/2008 | Shuhy | G06Q 30/0275 705/14.71 |
| 2009/0132265 | A1* | 5/2009 | Chaveriat | G06Q 50/01 705/319 |
| 2011/0124390 | A1* | 5/2011 | When | G07F 17/32 463/9 |
| 2011/0270751 | A1* | 11/2011 | Csinger | G06F 21/40 705/42 |
| 2014/0026048 | A1* | 1/2014 | Spirer | G06F 3/0484 715/716 |
| 2015/0032652 | A1* | 1/2015 | Brandes | G06Q 30/0279 705/319 |
| 2016/0162944 | A1* | 6/2016 | Lawrence | G06Q 20/405 705/14.55 |
| 2016/0210705 | A1* | 7/2016 | Florian | G06Q 50/01 |
| 2017/0330476 | A1* | 11/2017 | Bieber | G09B 7/08 |

FOREIGN PATENT DOCUMENTS

JP  2007226543 A  * 9/2007

* cited by examiner

*Primary Examiner* — Yehdega Retta
(74) *Attorney, Agent, or Firm* — DUNLAP CODDING, P.C.

(57) ABSTRACT

A non-transitory computer readable medium storing a set of computer executable instructions for running on a processor that cause the processor to: receive a video link to a video from a third party system. The video has an advertisement with one or more actions. At least one question related to the one or more actions of the advertisement and at least one correct answer to the question and at least one incorrect answer to the question is stored. The question is displayed on a donor system and the donor system is directed to the video via the video link. Then, at least one correct answer and at least one incorrect answer are displayed on the donor system.

18 Claims, 8 Drawing Sheets

FUNDRAISING PLATFORM

BACKGROUND

As people continue to turn away from television, advertisers are looking for creative ways to capture the attention of consumers. Hundreds of thousands of advertising dollars are being lost as consumers are "cutting the cord". According to a report form Nielsen, Americans are watching less live television than ever before. Additionally, 68% of the millennial generation choose to consume their media on a computer according to Verizon Digital Media, Millennials & Entertainment, Final Report, March 2014.

As advertisers look to move into creative methods of digital advertising, non-profit donors are looking to learn, act and give digitally. Additionally, with social media, each donor has the ability to offer not only monetary support, but also reach his or her online network to support a cause. Non-profits may benefit from enhanced online and social media fundraising campaigns.

There is a need to develop a fundraising platform that is capable of capturing the attention of a consumer. Such platform may be a new way to leverage existing donor bases while being able to bring in new donors with minimal post-launch workload.

BRIEF DESCRIPTION OF THE DRAWINGS

These and other objects and features of the present invention will be more fully disclosed or rendered obvious by the following detailed description of the invention, which is to be considered together with the accompanying drawings wherein like numbers refer to like parts, and further wherein.

DETAILED DESCRIPTION OF EXEMPLARY EMBODIMENTS

Figure 1:
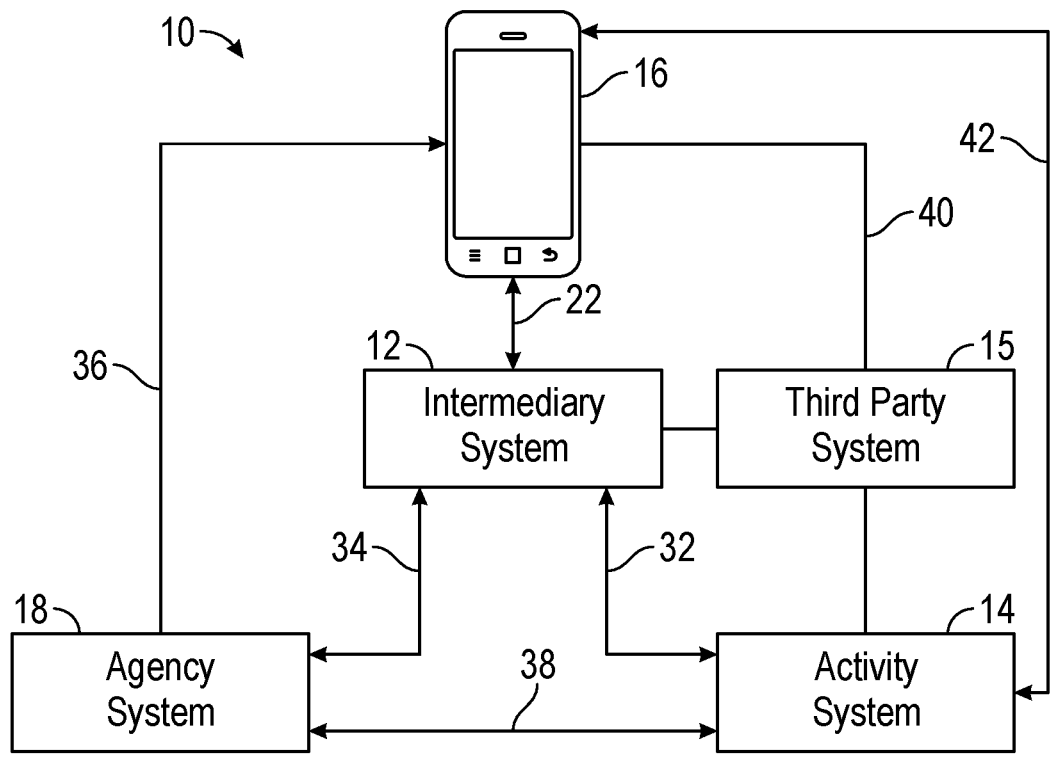
FIG. 1 illustrates a block diagram of an exemplary fundraising platform in accordance with the present disclosure.

Generally, a fundraising platform in accordance with the present disclosure may include a software application configured to provide a donor one or more opportunities to earn monetary donations for one or more non-profits via one or more activities. For example, the software application may allow the donor to view one or more advertising videos to earn monetary donations for one or more non-profits. Additionally, the software application may confirm viewing by the donor of the one or more advertising videos. Such fundraising platform may provide a volunteer, permission based system for donor engagement. Additionally, competition and challenges may be incorporated into the fundraising platform wherein earning point, recognition and/or rewards may entice donors to participate. Further, the software application may provide the capability for donors to use social media and/or other sharing platforms to interact with friends and/or social networks.

In some embodiments, the fundraising platform may include one or more interactive applications for use by advertisers. For example, advertisers may be capable of using the fundraising platform to provide further inquiries, surveys (e.g., virtual focus groups), outcomes (e.g., discount coupons), and/or the like.

Before explaining at least one embodiment of the presently disclosed and claimed inventive concepts in detail, it is to be understood that the presently disclosed and claimed inventive concepts are not limited in their application to the details of construction, experiments, exemplary data, and/or the arrangement of the components set forth in the following description or illustrated in the drawings. The presently disclosed and claimed inventive concepts are capable of other embodiments or of being practiced or carried out in various ways. Also, it is to be understood that the phraseology and terminology employed herein is for purpose of description and should not be regarded as limiting.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, certain well-known features may not be described in detail in order to avoid unnecessarily complicating the instant disclosure.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

The term "and combinations thereof" as used herein refers to all permutations or combinations of the listed items preceding the term. For example, "A, B, C, and combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. A person of ordinary skill in the art will understand that typically there is no limit on the number of items or terms in any combination, unless otherwise apparent from the context.

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

The use of the terms "at least one" and "one or more" will be understood to include one as well as any quantity more than one, including but not limited to each of, 2, 3, 4, 5, 10, 15, 20, 30, 40, 50, 100, and all integers and fractions, if applicable, therebetween. The terms "at least one" and "one or more" may extend up to 100 or 1000 or more, depending on the term to which it is attached; in addition, the quantities of 100/1000 are not to be considered limiting, as higher limits may also produce satisfactory results.

Further, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein qualifiers such as "about," "approximately," and "substantially" are intended to signify that the item being qualified is not limited to the exact value specified, but includes some slight variations or deviations therefrom, caused by measuring error, manufacturing tolerances, stress exerted on various parts, wear and tear, and combinations thereof, for example.

Software may include one or more computer readable instructions that when executed by one or more components cause the component to perform a specified function. It should be understood that algorithms or process instructions described herein may be stored on one or more non-transitory computer readable medium. Exemplary non-transitory computer readable medium may include random access memory, read only memory, flash memory, and/or the like. Such non-transitory computer readable mediums may be electrically based, optically based, and/or the like.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Certain exemplary embodiments of the invention will now be described with reference to the drawings. In general, such embodiments relate to generation of donations (e.g., micro-donations) and transference of such donations from a donor system to a non-profit entity.

Referring to the Figures, and in particular to FIG. 1, shown therein is a block diagram of an exemplary fundraising platform 10 in accordance with the present disclosure. Generally, the fundraising platform 10 may be configured to provide a user one or more activities to earn monetary donations (e.g., micro-donations) for one or more agencies (e.g., non-profit agency). Such opportunities may be provided by a third party and/or third party system, such as an advertising agency and/or company providing advertisements for a product and/or service, for example. The user may be provided access to the one or more activities, and upon completion of the activity, earn a pre-determined amount of funds. The fundraising platform 10 may provide the activities to the user, and collect the funds, or a determination of allocation of funds, upon completion of the activity. At least a portion of the funds may then be transferred to an agency, such as a non-profit agency. In some embodiments, the user may select and store within the fundraising platform one or more agencies to which at least a portion of funds may be distributed. In some embodiments, the third party and/or third party system may pre-determine one or more agencies to which funds may be distributed.

In one non-limiting example, one or more non-profit organizations may solicit one or more advertising firms for inclusion in the fundraising platform 10. In some embodiments, the fundraising platform 10 may be controlled by one or more non-profit organizations. In some embodiments, the fundraising platform 10 may be controlled by one or more advertising firms. Generally, the non-profit organization (or advertising firm) may create one or more campaigns. The one or more campaigns may be directed to raising funds for the non-profit organization via advertising for one or more third party goods or services. For example, a first campaign may be directed to raising funds for a homeless shelter by having users view one or more advertisements directed at a car dealership. Each view of the advertisement(s) by the user may allocate a micro-donation (e.g., $0.05) towards the fundraising campaign for the homeless shelter.

The fundraising platform 10 may include one or more intermediary systems 12. The intermediary system 12 may provide the one or more activities to earn monetary donations to users via a network 22 to one or more donor systems 16.

In some embodiments, the intermediary system 12 may account for and/or obtain funds from one or more activity systems 14 (e.g., advertising firm) based on the one or more activities for the user to earn monetary donations and distribute at least a portion of the funds to one or more agency systems 18 (e.g., non-profit agency). In some embodiments, collection of funds from the one or more activity systems 14 may be automatic (i.e., without human intervention by using an algorithm that uses predetermined inputs to effect steps within the process) and based on accounting provided by the intermediary system 12 of the user's completion of the one or more activities. Alternatively, the intermediary system 12 may be configured to provide an accounting of the one or more activities and provide the accounting to the activity system 14. In this example, the activity system 14 may distribute funds to the agency system 18 directly via any predetermined methodology, such as electronic transfer, wiring and the like. In some embodiments, the intermediary system 12 may provide the accounting of the one or more activities and associated users to the activity system 14 for review. Upon review and acceptance of the accounting, the activity system 14 may transmit funds to the intermediary system 12 for distribution to pre-identified ones of the agency systems 18. In some embodiments, distribution of funds to the one or more activity systems 14 may be automatic (i.e., without human intervention by using an algorithm that uses predetermined inputs to effect steps within the process) and based on accounting provided by the intermediary system 12 and pre-determined allocation guidance for distribution of funds.

In some embodiments, the one or more intermediary systems 12 may be configured to provide the donor system 16 the one or more activities to earn monetary donations (e.g., watching advertising videos). For example, the intermediary system 12 may transmit the one or more activities from a third party system (e.g., YouTube) or the activity system 14 (e.g., advertiser) to the donor system 16 such that the user can access the one or more activities. Upon completion of the activity, the intermediary system 12 may account for and/or collect funds from the activity system 14 based on completion by the donor of the activity, and distribute at least a portion of the funds to the agency system 18 (e.g., non-profit agency).

The intermediary system 12 may be a system or systems that are able to embody and/or execute the logic of the processes described herein. Logic embodied in the form of software instructions and/or firmware may be executed on appropriate hardware. For example, logic embodied in the form of software instructions or firmware may be executed on a computer system, a distributed processing computer system, and/or the like. In some embodiments, the logic may be implemented in a stand-alone environment operating on a single computer system, and/or logic may be implemented in a networked environment, such as a distributed system using multiple computers and/or processors. To that end, one or more elements of logic embodied in the form of software instructions or firmware may be executed in a stand-alone environment and one or more elements of the logic may be executed in the distributed system.

Figure 2:
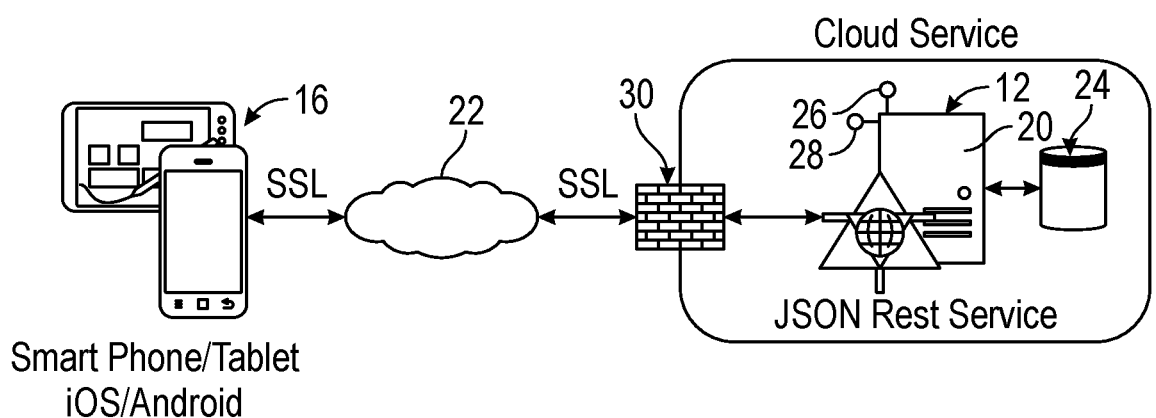
FIG. 2 illustrates a block diagram of another exemplary fundraising platform in accordance with the present disclosure.

Referring to FIGS. 1 and 2, in some embodiments, the intermediary system 12 may include one or more processors 20 configured to communicate with one or more donor systems 16 over a network 22. The one or more processors 20 may work together, or independently to execute processor executable code. Additionally, the intermediary system 12 may include one or more memories 24 capable of storing processor executable code. In some embodiments, each element of the intermediary system 12 may be partially or completely network-based or cloud-based, and may or may not be located in a single physical location.

The one or more processors 20 may be implemented as a single or plurality of processors working together, or independently, to execute the logic as described herein. Exemplary embodiments of the one or more processors 20 may include, but are not limited to, a digital signal processor (DSP), a central processing unit (CPU), a field programmable gate array (FPGA), a microprocessor, a multi-core processor, and/or combinations thereof, for example. The one or more processors may be capable of communicating via the network 22 or a separate network (e.g., analog, digital, optical, and/or the like) via one or more ports (e.g., physical or virtual ports) using a network protocol. The one or more processors 20 may be capable of reading and/or executing processor executable code and/or capable of creating, manipulating, retrieving, altering, and/or storing data structure into one or more memories (e.g., memory 24).

In some embodiments, the one or more memories 24 may be located in the same physical location as one or more processors 20. Alternatively, the one or more memories may be implemented as a "cloud memory" (i.e., one or more memories may be partially or completely based on or accessed using a network, for example).

The one or more memories 24 may store processor executable code and/or information comprising one or more databases and program logic. For example, the database hosted by the intermediary system 12 may store data indicative of an inventory of users accessing the donor systems 16, activities the users have initiated, completed, or have access to, data indicative of an amount of funds allocated to a particular activity, and/or data indicative of monetary donations accrued by the user for completion of an activity.

The intermediary system 12 may communicate with one or more donor systems 16 via the network 22. The network 22 may be almost any type of network. In some embodiments, the network 22 may use network topographies and/or protocols including, but not limited to Ethernet, TCP/IP, circuit switched paths, and/or combinations thereof. For example, in some embodiments, the network 22 may be implemented as a wireless network, a cellular network, a Global System for Mobile Communications (GSM) network, a code division multiple access (CDMA) network, a 3G network, a 4G network, a satellite network, an optical network, combinations thereof, and/or the like. It is also conceivable that in the near future, embodiments of the present disclosure may use more advanced networking topologies and/or protocols. Additionally, the one or more processors 20 and/or one or more memories may be capable of and configured to communicate with each other via the network 22 or additional networks. It is conceivable that in the near future, embodiments of the present disclosure may use more advanced networking topologies.

The network 22 may be secured using any desired secured networking protocol, such as a gateway server, a firewall, data encryption, public or private key cryptography infrastructure, secure socket layer protocol, hypertext transfer protocol secure, a virtual private network, a tunnel, secure shell, any combinations thereof, and/or the like. In some embodiments, the fundraising platform 10 may include a network security system 30. The network security system 30 may monitor and/or control incoming and outgoing network data based on a predetermined security guidelines. Generally, the network security system 30 may provide a barrier between the donor systems 16 and the intermediary systems 12. Additionally, in some embodiments, the network security system 30 may provide a barrier between the donor systems 16 and the intermediary system 12, activity system 14, and/or agency systems 18. The network security system 30 may be a host-based system running on the intermediary system 12 or a network system running between two or more networks (e.g., the Internet and an internal network of the intermediary system 12). In some embodiments, the network security system 30 may monitor and/or control traffic between two or more networks.

In some embodiments, the intermediary system 12 may include one or more input devices 26 and one or more output devices 28. The one or more input devices 26 may be capable of receiving information directly from a user, processor, and/or environment, and transmit such information to the one or more processors 20 and/or the network 22. The one or more input devices 26 may include, but are not limited to, implementation as a keyboard, touchscreen, mouse, trackball, microphone, fingerprint reader, infrared port, cell phone, PDA, controller, network interface, speech recognition, gesture recognition, eye tracking, brain-computer interface, combinations thereof, and/or the like.

The one or more output devices 28 may be capable of outputting information in a form perceivable by a user and/or processor(s). In some embodiments, the one or more output devices 28 may be configured to output information automatically (i.e., without human intervention). For example, in some embodiments, the one or more output devices 28 may be capable of printing or displaying at a pre-determined time interval an accounting of users, monetary donations, agencies, activities, and/or the like. The one or more output devices 28 may include, but are not limited to, implementation as a computer monitor, a screen, a touchscreen, a speaker, a website, a television set, an augmented reality system, a smart phone, a PDA, a cell phone, a fax machine, a printer, a laptop computer, an optical head-mounted display (OHMD), combinations thereof, and/or the like.

In some embodiments, the intermediary system 12 may communicate with the one or more donor system 16, the activity systems 14, and/or the agency systems 18 using any communication protocol (e.g., SOAP, XML, JSON, REST). For example, the intermediary system 12 may communication using a JSON Rest service communication protocol. In some embodiments, the intermediary system 12 may serve as the intermediary between all systems (i.e., donor system 16, activity system 14, agency system 18, and any third party systems). As such, in these embodiments, all requests from each of the systems 14, 16, 18, etc., will be directed through the intermediary system 12.

As discussed above, the fundraising platform 10 may include one or more activity systems 14. The intermediary system 12 may communicate with the activity system 14 for collection of funds, accounting of funds, and/or to provide one or more activities to the donor system 16.

The intermediary system 12 may communicate and/or transmit data with the activity system 14 via a network 32. In some embodiments, network 22 and network 32 may be the same network. The network 32 may be implemented as a wireless and/or wired network (e.g., any network configured to allow bi-directional exchange of data and/or signals), and may permit bi-directional communication of information and/or data between the intermediary system 12 and the activity system 14. The network 32 may use a variety of network protocols to permit bi-directional interface and communication of data and/or information between the intermediary system 12 and the activity system 14. The network 32 may be secured using any desired secured networking protocol, such as a gateway server, a firewall, data encryption, public or private key cryptography infrastructure, secure socket layer protocol, hypertext transfer protocol secure, a virtual private network, a tunnel, secure shell, any combinations thereof, and/or the like.

In some embodiments, a third party system 15 (e.g., YouTube) may provide one or more activities (e.g., videos) directly to the donor system 16 and/or to the donor system 16 via the intermediary system 12. For example, the third party system 15 may be a third party video storage platform and/or video-sharing platform, such as YouTube having a database of audio/video content. In another example, the activity system 14 may provide one or more videos stored on one or more memory to the donor system 16 directly and/or to the donor system 16 via the intermediary system 12. For example, the intermediary system 12 may be configured to communicate with the activity system 14 to access the videos and direct one or more donor system 16 to the one or more videos.

In some embodiments, the intermediary system 12 may transmit one or more communications to the activity system 14 requesting funds based on one or more accountings determined by the intermediary system 12. In some embodiments, the activity system 14 may directly provide the funds to the agency system 18 as indicated by arrow 38. In some embodiments, the activity system 14 may provide the funds to the intermediary system 12, with the intermediary system 12 allocating a portion of the funds to the agency system 18 based on accounting by the intermediary system 12.

In some embodiments, the intermediary system 12 may distribute funds to one or more agency systems 18, such as, a non-profit agency system, for example. For example, the intermediary system 12 may directly distribute monetary donations via the network 22 to the one or more agency systems 18. In another non-limiting example, a third party system (e.g., PayPal) may be used to distribute funds to the agency system 18. The intermediary system 12 may automatically initiate interaction with the third party system to authorize distribution of a pre-determined amount of funds to the agency, for example. In another non-limiting example, the intermediary system 12 may automatically provide a distribution in physical form (e.g., printed check) for mailing to a physical address of the agency. In some embodiments, the intermediary system 12 may automatically provide an accounting of distributions at a pre-determined interval (e.g., weekly distribution accounting).

The intermediary system 12 may communicate with the agency system 18 over a network 34. The network 34 may be similar to the networks 22 and/or 32. In some embodiments, the network 34 may be the same as the networks 22 and 32. The network 34 may be implemented as a wireless and/or wired network (e.g., any network configured to allow bi-directional exchange of data and/or signals), and may permit bi-directional communication of information and/or data between the intermediary system 12 and the agency system 18. The network 34 may use a variety of network protocols to permit bi-directional interface and communication of data and/or information between the intermediary system 12 and the agency system 18. The network 34 may be secured using any desired secured networking protocol, such as a gateway server, a firewall, data encryption, public or private key cryptography infrastructure, secure socket layer protocol, hypertext transfer protocol secure, a virtual private network, a tunnel, secure shell, any combinations thereof, and/or the like.

In some embodiments, the intermediary system 12 may provide the agency system 18 access to user accounts and/or portions of user accounts stored on the intermediary system 12. For example, the intermediary system 12 may provide the agency system 18 access to the user accounts to provide user contact information. As such, the agency system 18, using the contact information, may be able to directly contact the one or more users on the donor system 16 as indicated by arrow 36 on FIG. 1. Such direct access may allow for the one or more agency systems 18 to provide a thank you card, for example, to the user's physical address thanking the user for the specific donation to the agency through the fundraising software platform.

In some embodiments, the intermediary system 12 may provide a report to the agency system 18. The report may include information related to the users and/or activity systems 14 including, but not limited to name, address, amount of monetary donation, dates of use of fundraising platform, and/or the like. To that end, the agency system 18 may be able to contact the activity system 14 directly as indicated by arrow 38 in FIG. 1.

In some embodiments, the intermediary system 12 may provide user account access to the activity system 14 and/or provide a report to the activity system 14. The activity system 14 may then be able to directly contact the users via the donor system 16 and/or physical location to provide, for example, surveys (e.g., virtual focus groups), outcomes (e.g., discount coupons), and/or the like.

The donor system 16 may be implemented as a smartphone, a tablet, a laptop computer, a personal computer, a desktop computer, a computer terminal, a computer workstation, an e-book reader, a wireless network-capable handheld device, a personal digital assistant, a kiosk, a gaming system, and/or the like. Similar to the intermediary system 12, the donor system 16 may be provided with one or more processors, one or more non-transitory processor readable medium, an input device, and an output device. The processor, the one or more non-transitory processor readable medium, the input device, and the output device of the donor system 16 may be implemented similarly to or the same as the processor 20, the one or more memory 24, the input device 26, and the output device 28 respectively. The donor system 16 may be configured to interface with the network 22, via a wired or wireless interface.

The donor system 16 may store processor executable instructions or a software application. For example, the donor system 16 may include a web browser and/or a native software application running on the donor system 16 and configured to communicate with the intermediary system 12 over the network 22. The software application on the donor system 16 may be configured of accessing a website and/or communicating information and/or data with the intermediary system 12 over the network 22.

In some embodiments, the donor system 16 may include an application program (e.g., specialized program downloaded onto the donor system 16), and communicate with the intermediary system 12 via the network 22 through the application. In some embodiments, the network 22 may be the Internet and/or other network. For example, if the network 22 is the Internet, a primary user interface of fundraising platform software may be delivered through a series of web pages.

Figure 3:
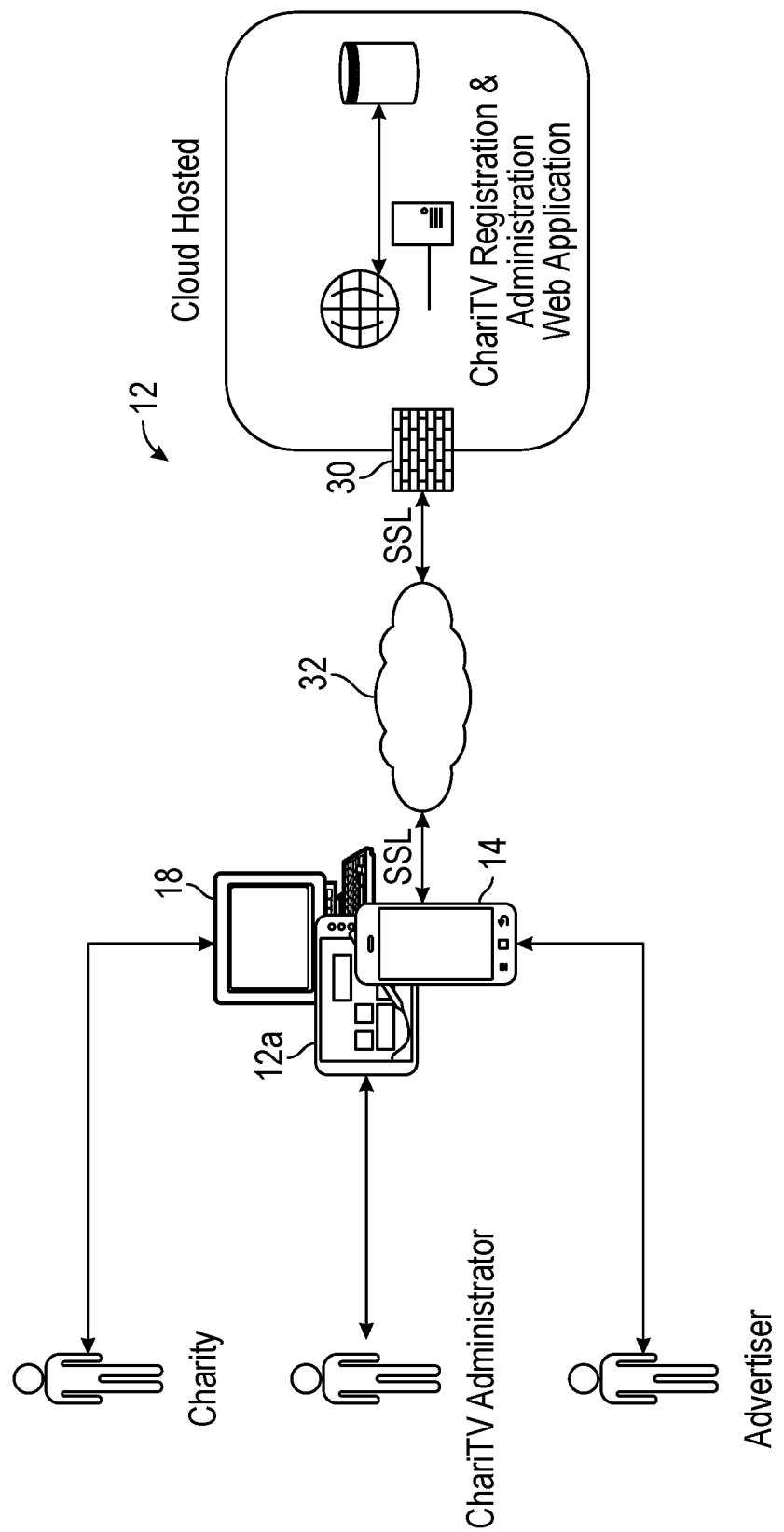
FIG. 3 illustrates a block diagram of another embodiment of an exemplary fundraising platform in accordance with the present disclosure.
Figure 4:
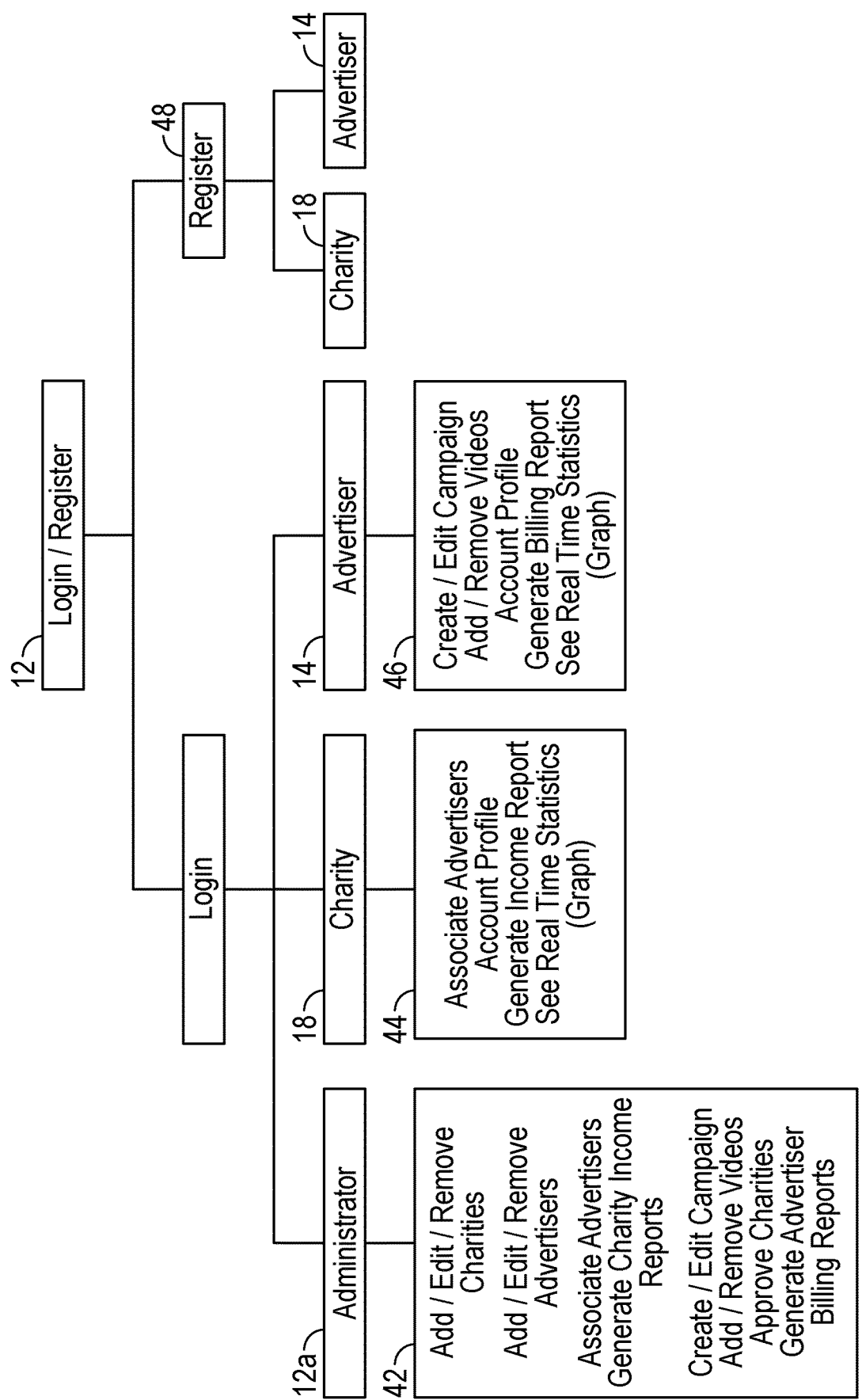
FIG. 4 illustrates a block diagram of an exemplary associated log-in and registration for systems within the fundraising platform illustrated in FIG. 3.

FIGS. 3 and 4 illustrate another exemplary embodiment of the fundraising platform 10. In particular, FIG. 3 is a block diagram illustrating communication between the intermediary system 12 and the activity systems 14, the agency systems 18, and an administrator system 12a. Communication may be through any communication protocol (e.g., SOAP, XML, JSON, REST). For example, the intermediary system 12 may communicate using a JSON Rest service communication protocol via network 32 and/or 34 (e.g., a cloud network). The network may be the same network 22 that the intermediary system 12 communicates with the donor system 16 (not shown in FIG. 3). In some embodiments, the intermediary system 12 may serve as the intermediary between all systems (i.e., activity system 14, agency system 18, and administrator system 12a). As such, all requests from each system will be directed through the intermediary system 12.

Each of the activity system 14, agency system 18 and administrator system 12a in FIG. 3 may be implemented as a smartphone, a tablet, a laptop computer, a personal computer, a desktop computer, a computer terminal, a computer workstation, an e-book reader, a wireless network-capable handheld device, a personal digital assistant, a kiosk, a gaming system, and/or the like. Additionally, each system 14, 18 and/or 12a may include an application program (e.g., specialized program downloaded onto the systems 14, 18 and/or 12a), and communicate with the intermediary system 12 via the network 32 through the application program.

Referring to FIG. 4, the administrator system 12a may be provided one or more administrator actions 42 during communication with the intermediary system 12. To that end, each action 42 may alter one or more database within the intermediary system 12, provide one or more reports (e.g., physical reports), and/or transmit one or more communications to the agency system 18, activity system 14 and/or donor system 16 (not shown in FIG. 4). Exemplary actions 42 may include, but are not limited to, add/edit/remove charities from database, add/edit/remove advertisers from database, associate advertiser with charity, generate one or more charity reports (e.g., reports showing allocation of funds to specific charity(ies) based on user(s) activities), create/edit campaign, add/remove activities (e.g., videos), approve charity (e.g., automatic charity sign-up process), generate advertiser, billing request).

Referring to FIG. 4, the agency system 18 may be provided one or more agency actions 44 during communication with the intermediary system 12. To that end, each action 44 may alter one or more database within the intermediary system 12, provide one or more reports (e.g., physical reports), and/or transmit one or more communications to the intermediary system 12. Exemplary actions 44 may include, but are not limited to associate advertisers with the non-profit agency, provide an account profile for the non-profit, update account profile for the non-profit, provide an account profile for one or more users, view real time statistics (e.g., allocated money, points, activities). Additionally, the agency system 18 may be prompted to register one or more accounts 48 with the intermediary system 12 and set up a charity account (e.g., provide non-profit name, address, mission, federal tax ID, and/or the like).

Referring to FIG. 4, the activity system 14 may be provided one or more agency actions 46 during communication with the intermediary system 12. To that end, each action 46 may alter one or more database within the intermediary system 12, provide one or more reports (e.g., physical reports), and/or transmit one or more communications to the intermediary system 12. Exemplary actions 46 may include, but are not limited to create and/or edit a campaign, add or remove videos, edit account profile, generate a billing request, view real time statistics (e.g., allocated money, points, activities). Additionally, the activity system 14 may be prompted to register one or more accounts 48 with the intermediary system 12 and set up an activity account (e.g., provide advertiser firm name, address, represented companies, and/or the like).

FIGS. 5-13 illustrate an exemplary embodiment of a fundraising software application for the fundraising platform 10 for use on the donor system 16. The fundraising software application may be downloaded onto the one or more donor systems 16.

Figure 5:
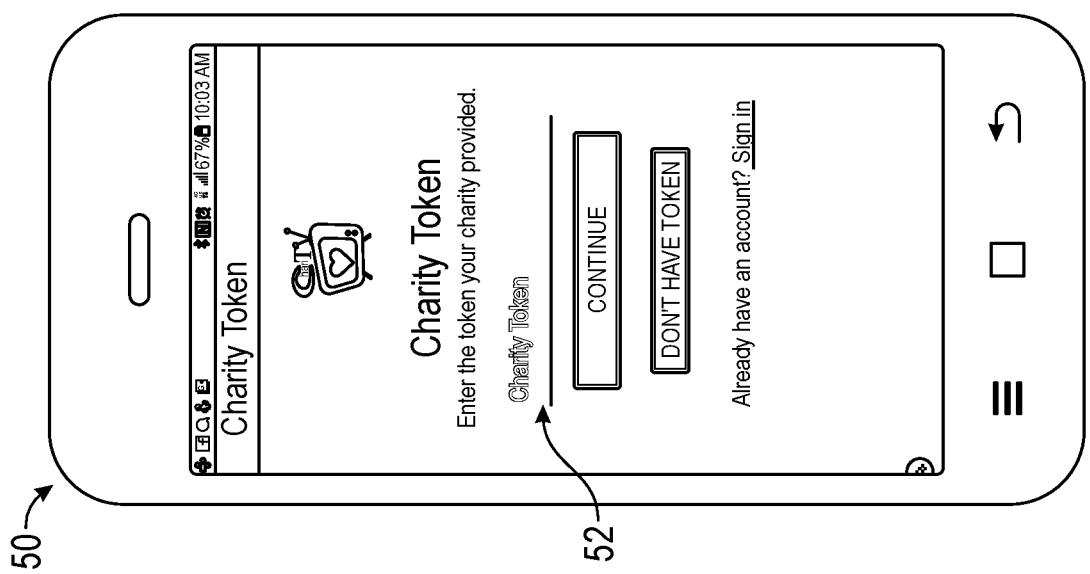
FIG. 5 illustrates a screenshot of an exemplary log-in screen of a fundraising software platform in accordance with the present disclosure.

FIG. 5 illustrates an exemplary screenshot 50 of a login-page for the fundraising software application. The fundraising software application may provide ability for storage and management of a user account. To that end, a collection of data associated with a particular user of the fundraising software application may be stored on the intermediary system 12 in the user account. In some embodiments, at least a portion of data associated with the particular user of the fundraising software application may be stored on the donor system 16 associated with the particular user. Each user account may include, but is not limited to, user name, password, defined security access levels, history of interactions (e.g., watch history, achievements, leaderboard metrics), setting preferences, demographic data, social media contacts and/or data, and/or the like, for example.

Referring to FIGS. 1 and 5, in some embodiments, each agency (e.g., non-profit) and/or agency system 18 may be assigned an identifier. The identifier may include one or more characteristics to track, identify the agency within the intermediary system 12, donor system, 16, activity system 14 and/or agency system 18. Each identifier may be individualized to each agency and may include, but is not limited to, an alphanumeric string, symbolic string, bar code, image, sound, QR code and/or the like. For example, a non-profit organization may provide donors and/or prospective donors a charity token having an alphanumeric string associated therewith. As illustrated in FIG. 5, a user may enter the alphanumeric string on the charity token on the donor system 16 in the field 52. By entering in the identifier (e.g., charity token alphanumeric string) the user may be associated with the non-profit organization within one or more database of the intermediary system 12 and/or within the user's account.

In some embodiments, the agency may provide an image as the identifier. The donor system 16 may include one or more systems (e.g., camera) configured to scan the image and upload the image to the intermediary system 12. The intermediary system 12 may then associate the user with the agency within one or more database within the intermediary system 12 and/or the user account. It should be noted that each user may be associated with multiple agencies within the database. Further, multiple users may be associated with a single agency within the database.

In some embodiments, the fundraising software platform may provide a listing of all agencies within the fundraising platform 10. To that end, the user may select the particular agency desired to receive the funds from the activity system 14 and the intermediary system 12. For example, the user may select an agency from a drop down menu to associate subsequent allocation of funds (via activities completed).

In some embodiments, during the log-in and/or registration process, the user may be given an option to link the user account with one or more social media platforms (e.g., Facebook, Linked-In, Twitter). By linking the social media platform, the intermediary system 12 may be able to determine additional information associated with the user including, but not limited to age, demographics, schooling, location, and/or the like. Such information may be stored within the user profile and/or used to determine activities to provide the user in the fundraising platform 10.

In some embodiments, the donor system 16 may store a User ID and a Charity ID locally. During the initial log-in, if the User ID and/or the Charity ID is not found locally on the donor system 16, the user may be prompted to complete a registration process. For example, if the User ID is not found on the donor system 16 during connection to the intermediary system 12, then the user may create a new account, select a charity (e.g., enter the charity token), log-in to one or more social media platforms, and/or the like.

Figure 6:
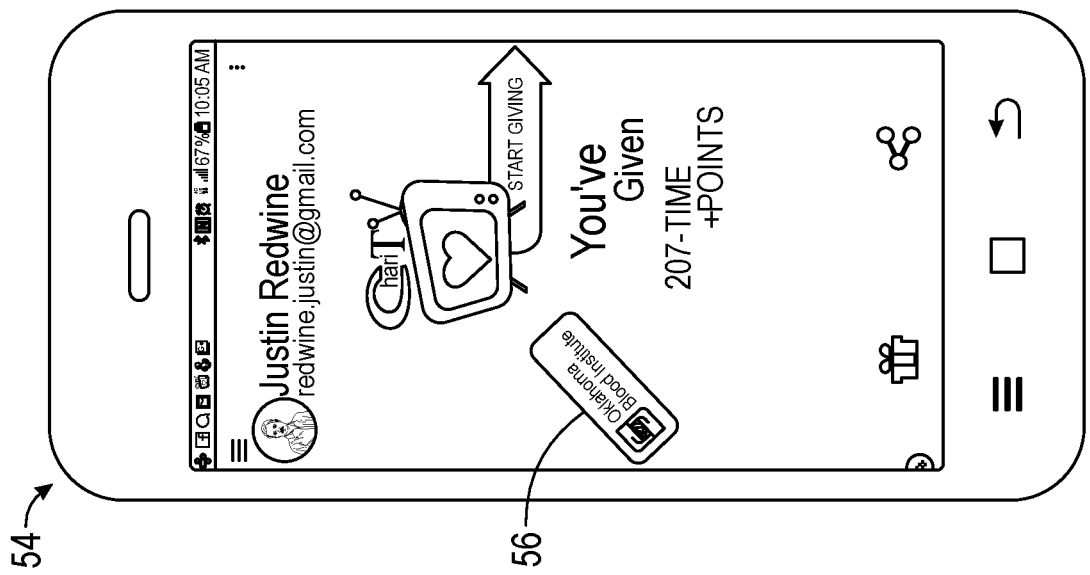
FIGS. 6-7 illustrate screenshots of exemplary elements related to a fundraising software platform in accordance with the present disclosure.

FIG. 6 illustrates another exemplary screenshot 54 of the fundraising software application configured to be displayed subsequent to the user being associated with the agency and/or agency system 18. Generally, the donor system 16 may query the intermediary system 12 to provide analytical data about prior performance and/or history (e.g., point allocation, monetary distributions). Such information may be presented on the donor system 16 to the user (e.g., Java script object notation about the number of games played by the user).

Once the donor system 16 is allocated towards a particular agency system 18 (e.g., via one or more identifiers), an agency icon 56 may be displayed indicating that the user and/or donor system 16 is associating a subsequent activity with the particular agency and/or agency system 18.

In some embodiments, the fundraising software application may provide an accounting of prior activities. For example, in FIG. 6, the fundraising software application states "You've Given 207 Time Points". This may indicate that the user has accumulated 207 points to be used in distributing monetary funds to one or more agencies. In some embodiments, the accounting may be specific to a single agency. In some embodiments, the accounting may be generalized to all accumulated points. As used herein, "points" is a unit of scoring to measuring value, such as a credit towards a benefit. In this example, the activity provided may be based on a particular amount of "time" (e.g., time segments) the user has performed the activity (e.g., watching advertisements).

Figure 7:
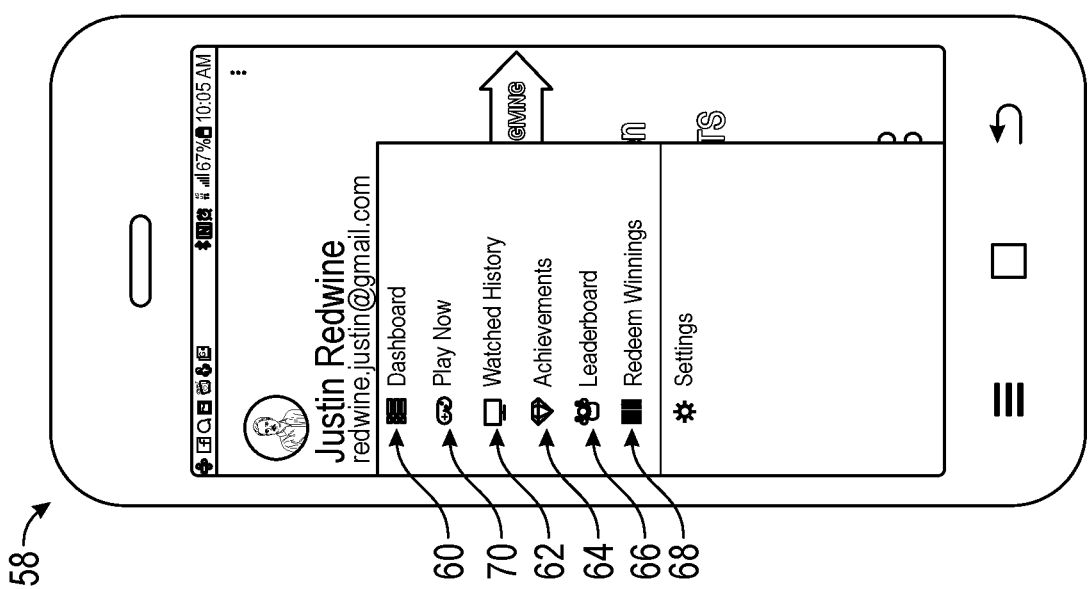

Referring to FIG. 7, the user of the fundraising software application may be able to access one or more lists of commands or options as illustrated in the screen shot 58 and described in further detail herein.

In some embodiments, the fundraising software application may provide access to a dashboard via a link 60. The dashboard may provide a user interface that organizes and presents information in a simplified format for the user. The dashboard may integrate information from multiple components of the fundraising software platform in a unified display from the user. For example, the dashboard may provide one or more current metrics and/or performance indicators. Generally, the dashboard may obtain information from the intermediary system 12, donor system 16, agency system 18 and/or activity system 14 and present it to the user. In some embodiments, the intermediary system 12 may receive information and/or data from the agency system 18, activity system 14 and/or donor system 16, analyze the information and/or data and present the data on the dashboard.

In some embodiments, the fundraising software platform may provide access to an activity history via a link 62. For example, in the screen shot 58 of FIG. 7, the activity history is a watched history. Activity history may be a detailed list of each activity completed for a predetermined time interval. The activity history may be stored on the donor system 16, intermediary system 12 and/or the activity system 14. Activity history may be used to trace and/or monitor a user's completion of one or more activities. Activity history may be viewed by date, time of day, title, alphabetical order, number of views, and/or the like. Additionally, the intermediary system 12 may determine if there are any available activities for the user. For example, the intermediary system 12 may determine if there are any available videos for the user.

In some embodiments, the fundraising software platform may provide one or more incentives to one or more users. For example, in some embodiments, the fundraising software platform may provide a "game"-type interaction to promote use of the platform. To that end, the fundraising software platform may provide one or more achievements 64, leaderboards 66, redemptions 68, and/or challenges.

Achievements 64 may provide one or more users with feedback during interaction with the fundraising software platform along with one or more optional goals for the user to pursue. Generally, achievements 64 may be quantitative or qualitative goals that one or more users may accomplish. As the user meets the goal, the user may be rewarded. User, for example, may earn achievements 64 by participating in one or more activities (e.g., watching a video), sharing one or more activities (e.g., sharing via social media), visiting one or more physical locations (e.g., visiting one or more agencies), and/or the like.

In some embodiments, each achievement 64 may provide a pre-determined amount of points upon a triggering condition. For example, a user may be allocated one point for the triggering condition of answering a question correctly. Allocation of points may be based on each particular activity.

In some embodiments, achievements 64 may be shared between users via the intermediary system 12. In some embodiments, achievements 64 may be stored on the intermediary system 12. Alternatively, at least a portion of data related to the achievements 64 (e.g., point allocation) may be stored on the donor system 16. For example, the fundraising software program may provide one or more videos to be stored locally on the donor system 16 such that a user may view the videos when disconnected from the network 22. As such, points may be allocated while disconnected from the network 22, and upon connection to the network 22, data may be transmitted to the intermediary system 12 and one or more databases updated with the user's achievements 64 and/or associated data.

Rankings on the leaderboard 66 may be based on one or more metrics including, but not limited to, point allocation, time values, monetary values, views, abstract numbers (such as an integer or a fixed point number), and/or the like. Order of rankings may be in any order (e.g., low-to-high, high-to-low). In some embodiments, the leaderboard 66 may provide one or more measures of how well the user compared to other users of the fundraising software platform. For example, users may be ranked based on the amount of points achieved. In some embodiments, the leaderboard 66 may provide one or more measures of the amount of funding received by one or more agencies. For example, non-profit agencies may be ranked by the amount of funding received via the fundraising software platform. In some embodiments, the leaderboard 66 may provide one or more measures of participation in one or more activities. For example, videos may be ranked by the number of views by users.

Users may be provided one or more redemptions 68 for participating in the one or more activities. In some embodiments, the redemptions 68 may be providing one or more monetary donations to the one or more agency systems 18 and/or agencies. For example, by completing a particular activity, the user may be allocated a certain amount of points with each point representing a monetary value capable of being donated to one or more agencies (e.g., one or more non-profits).

In some embodiments, users may challenge other users to earn achievements 64 and/or measure progress. Challenges may be initiated via a first donor system 16. The challenge data and information may be transmitted to the intermediary system 12 wherein the intermediary system 12 may inform one or more donor systems 16 of the challenge. In some embodiments, challenges may be initiated by the donor system 16 via a third party platform (e.g., social media platform). For example, a user may report progress via one or more social media platforms (e.g., Facebook, Twitter), and initiate a challenge providing a link to the fundraising software platform and/or website/web service providing the fundraising software platform.

Figure 8:
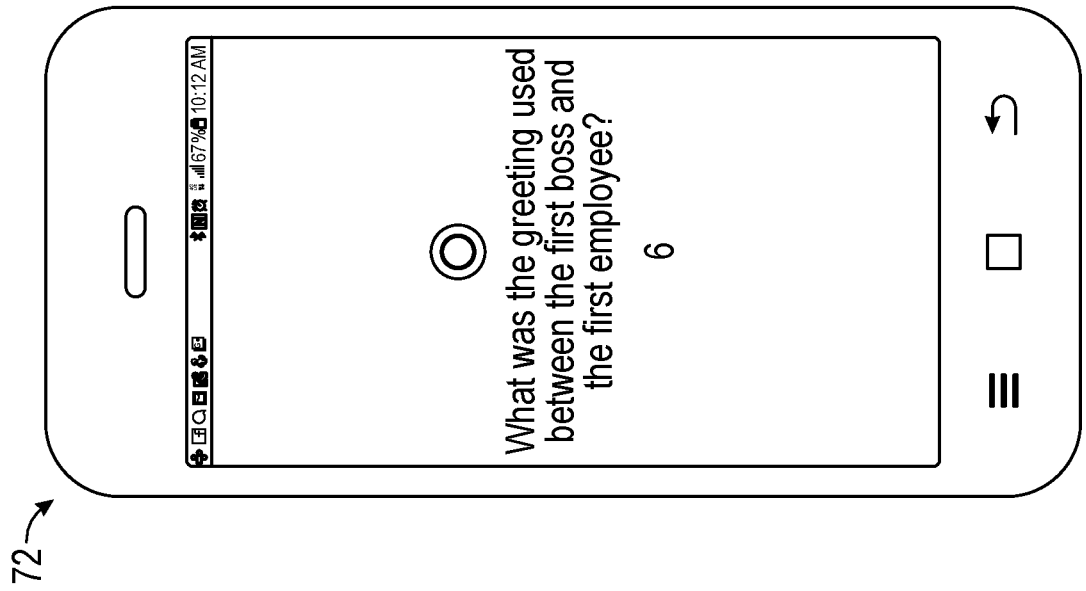
FIGS. 8-10 illustrate screenshots of an exemplary activity of a fundraising software platform in accordance with the present disclosure.

Referring to FIGS. 7 and 8, the user may proceed to the one or more activities using a link 70. For example, the link 70 in FIG. 7 recites, "Play Now". By clicking on the link 70, in some embodiments, a signal is sent to the intermediary system 12, and the intermediary system 12 may connect the donor system 16 to the one or more activity systems 14. Alternatively, the one or more activities may be stored within the intermediary system 12. In some embodiments, at least a portion of the activity may be stored on the donor system 16, intermediary system and/or activity system 14.

Figure 10:
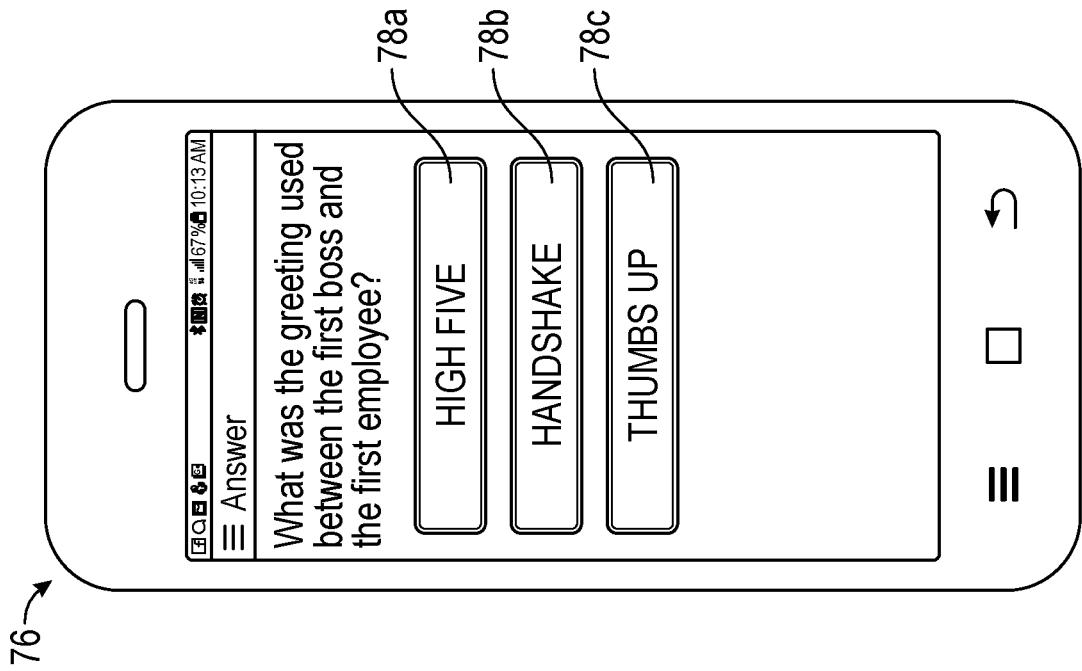
Figure 9:
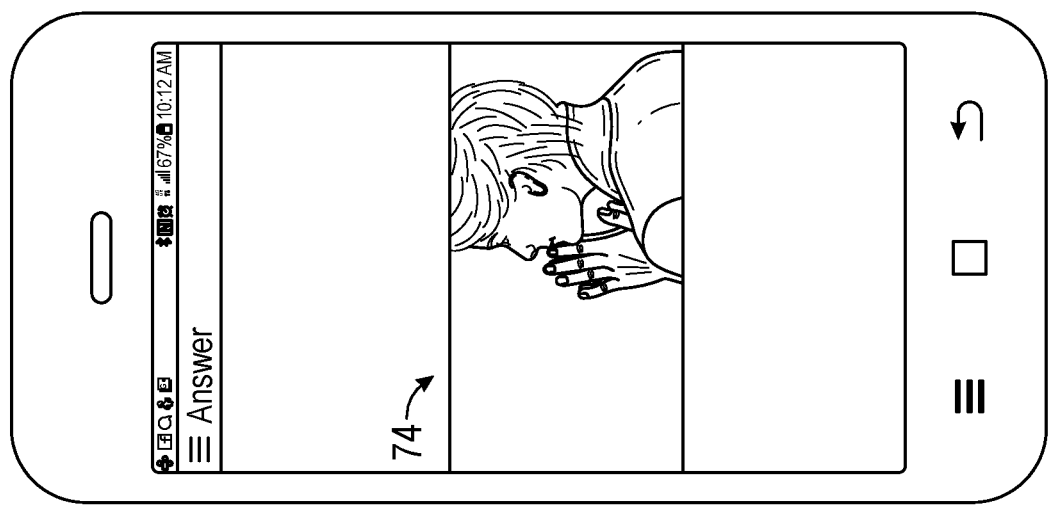

FIGS. 8-10 illustrate an exemplary embodiment of one activity provided by the activity system 14 and/or intermediary system 12 and configured to earn monetary funds by the user completing the activity. Generally, the user may be provided one or more videos (e.g., advertisements such as an audio/video commercial for a product or a service) to view on the donor system 16. The user may be presented with a query regarding the advertisement, such as a video prior to viewing the video as shown in a screenshot 72 shown in FIG. 8. The query may be in the form of one or more multiple choice questions, true/false questions, short answer, numerical, and/or the like. Additionally, question types may be factual, evaluative, convergent, divergent, combinations, and/or the like. For example, in the screenshot 72, the user prior to viewing the video is presented the question, "What was the greeting used between the first boss and the first employee?" Each video may have one or more associated queries. Each time the video is shown to the user, at least one question is asked. If the user answers correctly, then the question may be eliminated from the database associated with the User ID. For example, once the user has watched the video and answered all associated questions, the video may no longer be available to the user to view. In this example, the intermediary system 12 may include one or more database having the videos and associated questions. Each time the video is viewed, the associated count for that video associated with that user may be updated and/or the video may be eliminated for selection by the user. Additionally, each time a question is answered correctly, the associated count for that question may be updated and/or the question may be eliminated for selection by the user.

In some embodiments, the user may select (e.g., settings) the amount of time that the query may be presented on the donor system 16. For example, the user may select 10 seconds as the amount of time the query remains on the donor system 16 prior to presentation of the video.

Referring to FIG. 9, the user is then able to view the video provided by the intermediary system 12 and/or the activity system 14. In some embodiments, the one or more videos may be stored and/or provided by the activity system 14 directly to the one or more donor systems 16. In some embodiments, the one or more videos may be stored and/or provided by the intermediary system 12. In some embodiments, the one or more videos may be provided by the activity system 14 to the intermediary system 12, with the intermediary system 12 directing the video to the one or more donor systems 16. In some embodiments, the user may be capable of storing and/or sharing videos via the donor system 16.

In some embodiments, the video may be directed to the donor system 16 from a third party system (e.g., YouTube) as illustrated by arrow 40 in FIG. 1. For example, the intermediary system 12 may first provide the query to the user as shown in FIG. 8. The intermediary system 12 may then send an address or URL to the donor system 16 thereby directing the user to one or more videos on the third party system 15 for viewing. To that end, the intermediary system 12 provides questions/queries to video currently online and able to be viewed and/or on a private channel of the intermediary system 12

Upon completion of the video, the intermediary system 12 may again provide the query to the donor system 16 as shown in the screenshot 76. In some embodiments, the user may be provided with multiple answers 78. For example, in the screenshot 76, the user is presented with the answers 78*a*, 78*b* and 78*c*. In some embodiments, the user may be presented with a field for answering the query (e.g., short answer, numerical answer). Upon selection of the correct answer 78, the user may obtain one or more points, achievements, and/or the like. For example, upon selection of the correct answer 78, the intermediary system 12 may add one or more points to the user's account. Additionally, the intermediary system 12 may update the database having the video and/or queries associated with the user. For example, for a correct answer 78, the associated count may be updated and/or the question flagged as unavailable for the user during future viewing of the video.

Upon selection of an incorrect answer 78, the intermediary system 12 may provide an indicator to the user that the answer was incorrect. In some embodiments, the user may be presented an option to review the video. To that end, the user may, in some embodiments, be able to view the video multiple times with the same question until the question is answered correctly.

In some embodiments, the user may increase point allocation via one or more bonuses. For example, the intermediary system 12 may include a timing system such that if the user answered the question correctly within a pre-determined time frame, then the user may increase point allocation by a pre-determined amount.

Once the points are allocated to the user account, funds may be distributed to the agency and/or agency system 18 as described herein. In some embodiments, the user may also be provided an opportunity to increase the amount of donation provided to the agency and/or agency system 18. For example, the fundraising software platform may ask the user if the user would like to provide additional funding by entering a specific numeric code, alphanumeric answer, and/or the like. In some embodiments, the fundraising software platform may communicate with texting software on the donor system 16 such that the user may participate in a Text-to-Give program (i.e., the user sends a text message to a particular phone number to give funds to the agency).

Figure 11:
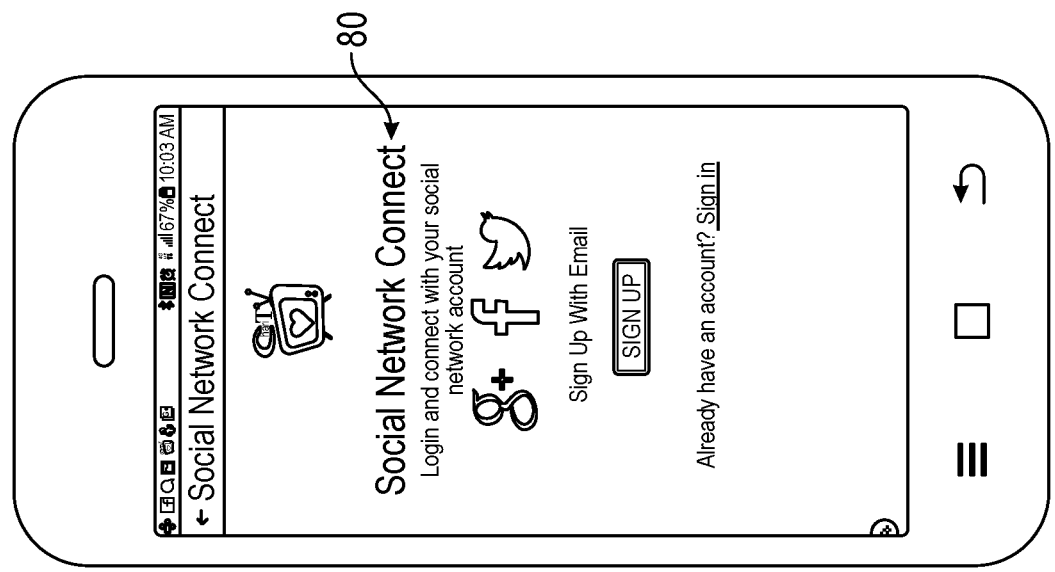
FIG. 11 illustrates a screenshot of an exemplary social media sign-up screen of a fundraising software platform in accordance with the present disclosure.

Referring to screenshot 80 in FIG. 11, the fundraising software platform may be configured to provide access to one or more social media platforms (e.g., Google+, Facebook, Twitter, and/or the like). To that end, the user may provide one or more postings, access to contacts, and/or social network information to the social media platforms. For example, a user may share one or more achievements, point allocations, fund distributions, general fundraising software platform information, and/or the like with the social media platform providing information to users and/or potential users. Additionally, the intermediary system 12, once connected to the social media platform, may determine and/or store in the user account additional information related to the user such as age, demographics, schooling, friends, and/or the like. Such information may be used to determine activities and/or provide demographics for selection of appropriate activities (e.g., car dealership providing videos for recent graduates).

After viewing one or more videos a configurable number of times, the user may be given an option of playing an additional game (e.g., Wheel of Fortune spinner) to obtain additional points for the non-profit organization. For example, after viewing ten videos, the user may be given the option to "spin a wheel" on the donor system 16 to collect additional points. Additional points may be updated within the database of the intermediary system 12 associated with the user.

In some embodiments, the agency system 18 and/or the non-profit organization may be able to provide one or more videos related to the non-profit for viewing by the user. For example, after a pre-determined number of activities, the intermediary system 12 may provide a video related to the non-profit organization. In some embodiments, after a pre-determined number of activities, the intermediary system 12 may provide a question unrelated to the activities to collect and/or promote the user. For example, after viewing five videos, the intermediary system 12 may prompt the user with a query such as "Do you plan to buy a new home in the next few months?". The intermediary system 12 may use answers to such questions to target marketing the user.

Figure 12:
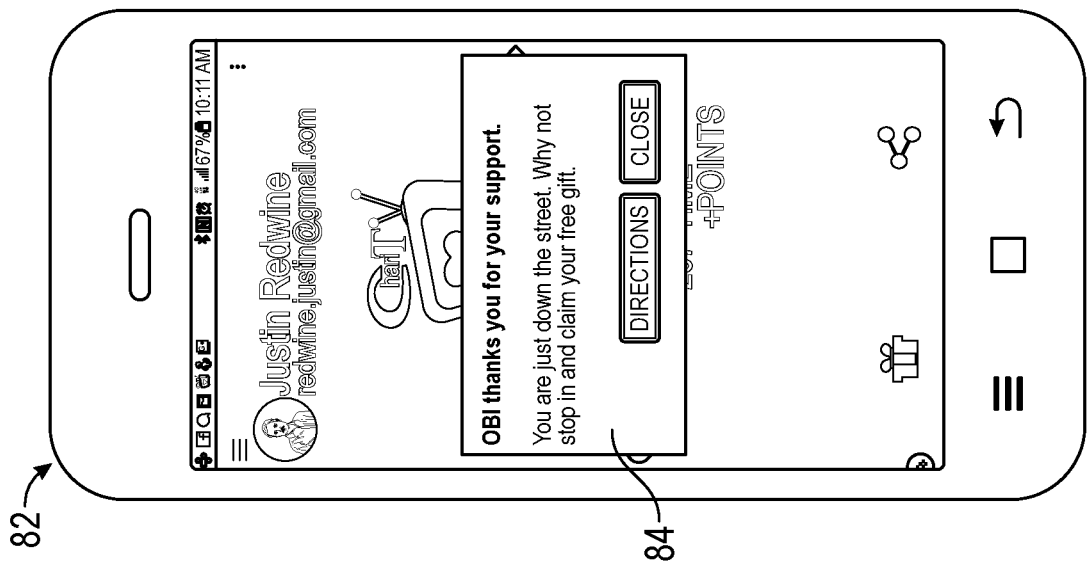
FIGS. 12-13 illustrate screenshots of an exemplary mapping element of a fundraising software platform in accordance with the present disclosure.
Figure 13:
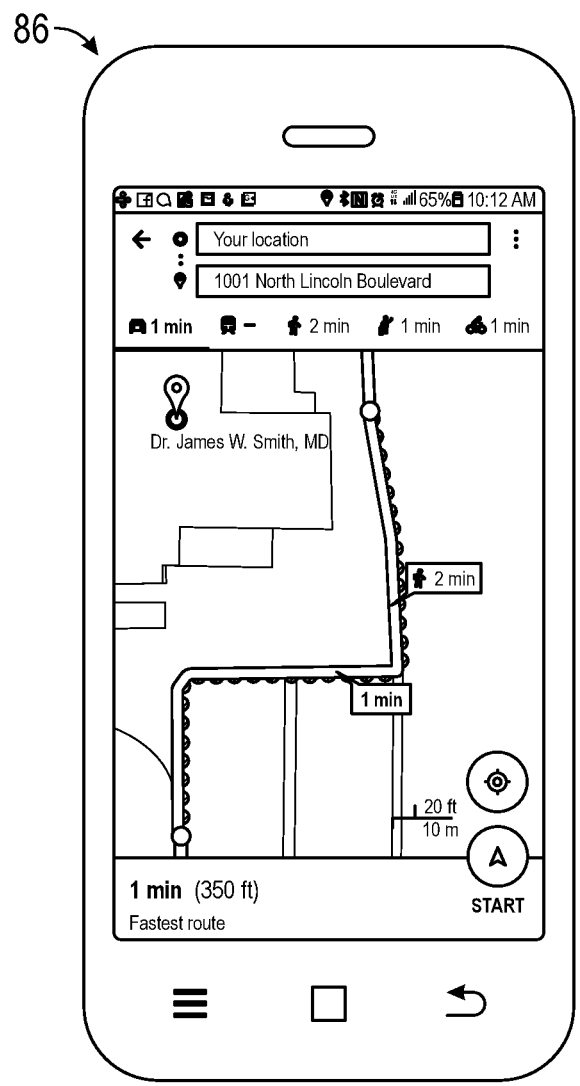

Referring to FIGS. 12 and 13, in some embodiments, the software application on the donor system 16 may include a mapping element and/or access to one or more mapping elements within the donor system 16. For example, the software application may include one or more geofences (i.e., virtual geographic boundaries defined by GPS or RFID technology that enables software to trigger a response when a device enters or leaves a particular area. The mapping element may use location of the donor system 16 provided by one or more positioning systems (GPS, AGPS, Wi-Fi positioning, cellular positioning, and/or the like) to determine proximity to one or more agencies. When proximity to the one or more agencies or other pre-determined triggering event occurs, the software application may send an indicator 84 to the user on the donor system 16 such as shown in screenshot 82 in FIG. 12. The software application may further provide directions to the one or more agencies as indicated in FIG. 13 as indicated in screenshot 86 shown in FIG. 13. For example, the user may receive an indication that the user is within distance (e.g., 2 miles) and solicit the user to stop at a location (e.g., "You are by the blood bank, please come give blood"). Additionally, users may be directed to location of one or more advertisers (e.g., 20% off of coffee at Sally's Coffee Shop). The mapping element may remain active even if the donor system 16 is not connected to the intermediary system 12. Additionally, the mapping element, associated points, redemption of prizes may be updated upon connection to the intermediary system 12.

In some embodiments, one or more groups of advertisers at different locations may be included within a treasure hunt. To that end, if the user visits each of the locations of the advertisers, or a predetermined amount of locations, then additional points may be added to the user's account. In some embodiments, the user may provide one or more images via the donor system 16 of the location. The images may be communicated to the intermediary system 12 for validation. In some embodiments, the location of the user may be provided via the donor system 16 to the intermediary system 12 for validation.

In some embodiments, the mapping element may be used to provide one or more tangible prizes to the user. For example, one or more tangible prizes may be "won" by the user via the fundraising platform (e.g., Wheel of Fortune game). The mapping element may signal to the user proximity to a location wherein the prize may be retrieved (e.g., drive to local coffee shop and redeem cup of coffee). Redemption may be provided via the donor system 16 (e.g., barcode on screen, QR code). Once the tangible item is retrieved, the intermediary system 12 may update the user's account accordingly. It should be noted that the mapping element is optional for redemption of tangible prizes. To that end, the donor system 16 and/or the intermediary system 12 may provide a listing (e.g., winnings screen). The user may be able to access the screen without being in proximity to the location of acquisition of the tangible product.

The fundraising platform systems and methods disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. One or more non-transitory computer readable medium storing a set of computer executable instructions for donor engagement running on one or more processors of an intermediary system that when executed cause the one or more processors to provide a fundraising platform by:

storing a user account related to a user of a donor system;
receiving a video link to a video from a third party system, the video having an advertisement with one or more actions;
storing a question related to the one or more actions of the advertisement and at least one correct answer to the question and at least one incorrect answer to the question;
sending a first communication to the donor system, the donor system having a processor, an output device and an input device, the first communication including at least the question and the video link and causing the processor of the donor system to display the question on the output device and to not display the at least one correct answer to the question or the at least one incorrect answer to the question on the output device, and then subsequently direct the donor system to initially display the video via the video link such that the question is displayed on the output device prior to the donor system and the intermediary system enabling the donor to view the video;
sending a second communication to the donor system, the second communication causing the output device to display the question and the at least one correct answer and at least one incorrect answer on the output device subsequent to the donor system displaying the video via the video link whereby the donor system is directed to display the question on the output device before the user is able to initially view the video and then display the question on the output device after displaying the video; and,
receiving a first response from the donor system, the first response corresponding to the at least one correct answer or the at least one incorrect answer, the first response being a response to the question after the video is displayed; and
allocating at least one point to the user account when the first response and the at least one correct answer are similar.

2. The one or more non-transitory computer readable medium storing the set of computer executable instructions for running on one or more processors of claim 1 further comprising transmitting a billing report to an agency system.

3. The one or more non-transitory computer readable medium storing the set of computer executable instructions for running on one or more processors of claim 1, further comprising determining an amount of funds to be distributed to an agency system.

4. The one or more non-transitory computer readable medium storing the set of computer executable instructions for running on one or more processors of claim 3, wherein the agency system is a non-profit organization.

5. The one or more non-transitory computer readable medium storing the set of computer executable instructions for running on one or more processors of claim 4, further comprising receiving an identifier from the donor system, the identifier associated with the non-profit organization.

6. The one or more non-transitory computer readable medium storing the set of computer executable instructions for running on one or more processors of claim 5, wherein the identifier is an alphanumeric code.

7. The one or more non-transitory computer readable medium storing the set of computer executable instructions for running on one or more processors of claim 5, wherein the identifier is provided on a charity token.

8. The one or more non-transitory computer readable medium storing the set of computer executable instructions for running on one or more processors of claim 4, wherein determining the amount of funds and transmission of funds to the non-profit organization is automatic and without human intervention.

9. An automated method performed by at least one processor of an intermediary system running computer executable instructions stored on at least one non-transitory computer readable medium to provide a fundraising platform, the automated method comprising:

receive at least one communication from a donor system, the at least one communication including an identifier of an agency system;
associate the identifier with a user account, the user account related to a user of the donor system;
provide at least one activity to the donor system, each of the at least one activity being a defined interaction between the donor system and the user;
allocate at least one point to the user account upon completion of the activity;
determine funds to be distributed to the agency system based on points allocated to the user account;
transmit funds to the agency system.

10. The automated method of claim 9, further comprising providing a second activity to the donor system, wherein completion of the second activity increases the allocation of points of the first activity.

11. The automated method of claim 9, further comprising obtaining the at least one activity from a third party video sharing system.

12. The automated method of claim 9, further comprising obtaining the at least one activity from an activity system.

13. The automated method of claim 9, further comprising obtaining funds from the at least one activity system for transmission to the agency system.

14. The automated method of claim 13, further comprising generating a billing report including amount of funds transfer and transmitting the billing report to an activity system.

15. The automated method of claim 9, wherein the identifier is a QR code obtained by the donor system.

16. The automated method of claim 15, wherein the QR code is on a charity token.

17. An automated system, comprising:
at least one processor of an intermediary system executing a fundraising software platform receiving:
at least one identifier from a donor system, the identifier associated with an agency system;
at least one response from the donor system; and
at least one database storing at least one question and at least one answer related to a video presented to the donor system; and
wherein the fundraising software platform executed by the processor:
causes the donor system to display a question without the at least one answer to the question before a video is initially displayed, then to display the video, and to display the question after the video is displayed, the response being a response to the question after the video is displayed;

determines an allocation of points based on the at least one response in comparison to the at least one answer; and, distributes funds to the agency system based on the allocation of points.

18. The automated system of claim 17, wherein the fundraising software platform provides the video to the donor system and the question is displayed on the donor system prior to displaying the video and subsequent to displaying the video.

* * * * *